July 21 1925.　　　　　　　　　　　　　　　　　1,546,954
F. V. TISCHER
COMPOSITE STRUCTURE
Filed April 26, 1923　　　2 Sheets-Sheet 1
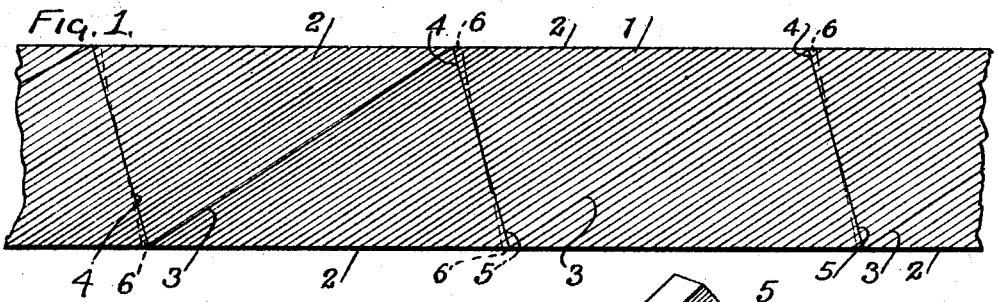
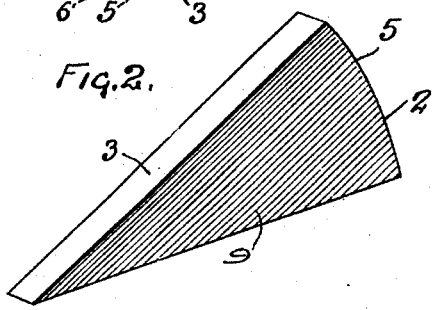
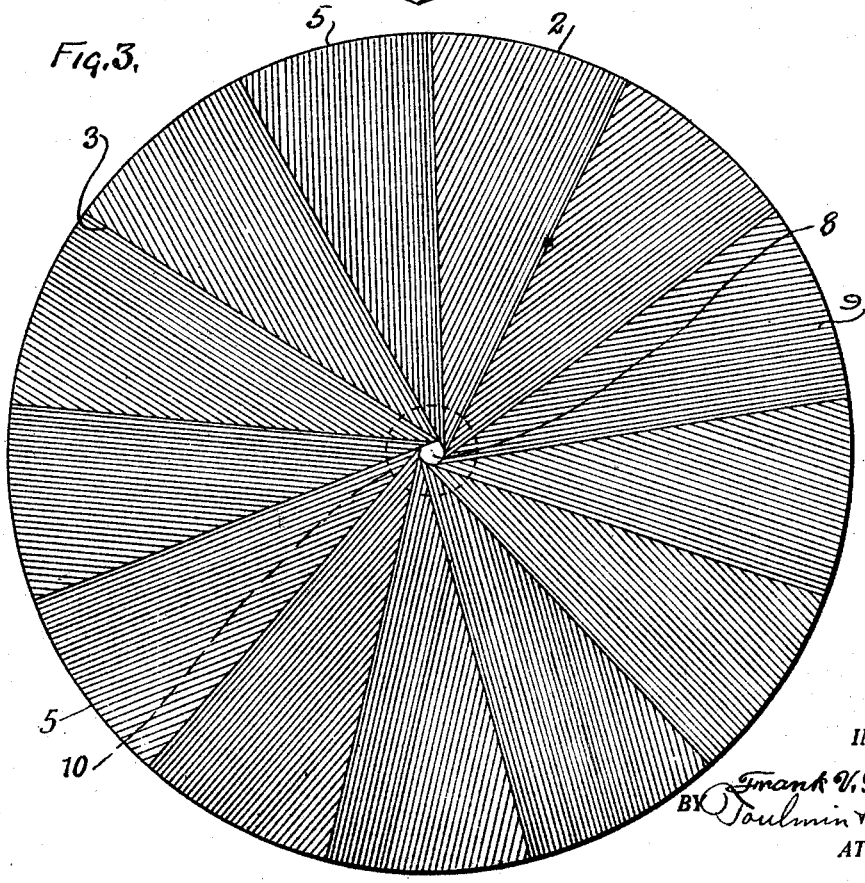
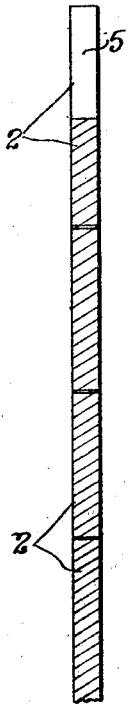
INVENTOR.
Frank V. Tischer,
BY Toulmin & Toulmin,
ATTORNEYS.

July 21 1925.                                                1,546,954
F. V. TISCHER
COMPOSITE STRUCTURE
Filed April 26, 1923          2 Sheets-Sheet 2

INVENTOR.
Frank V. Tischer,
BY Toulmin & Toulmin,
ATTORNEYS.

Patented July 21, 1925.

1,546,954

UNITED STATES PATENT OFFICE.

FRANK V. TISCHER, OF DAYTON, OHIO.

COMPOSITE STRUCTURE.

Application filed April 26, 1923. Serial No. 634,919.

*To all whom it may concern:*

Be it known that I, FRANK V. TISCHER, a citizen of the United States, residing at Dayton, in the county of Montgomery and State of Ohio, have invented certain new and useful Improvements in Composite Structures, of which the following is a specification, reference being had therein to the accompanying drawing.

My invention relates to composite structures, and particularly to composite structures assembled from separate pieces of fibrous material.

It is the object of my invention to provide composite structures of great strength assembled from a plurality of independent pieces which can be economically produced from scraps and boards.

It is my especial object to provide a wheel made of pieces of wood of great strength and rigidity, yet constructed of the cheaper pieces of wood in a simple manner, with the least waste.

It is my object to provide a disc wheel for automotive vehicles in which the lines of division of the several parts will not coincide, and will always be at an angle to one another, and in some instances the several parts will overlap one another, thus reinforcing and bracing the wheel, making it rigid and durable, yet manufactured of the cheaper materials or from scrap.

Referring to the drawings:

Figure 1 is a plan view of a board, showing the method of cutting the sections therefrom to compose a composite wheel with a minimum waste of material.

Figure 2 is a perspective of one of the sections composing the wheel.

Figure 3 is a plan view of the complete wheel with the sections assembled.

Figure 4 is a section of Figure 3 on the line 4—4.

Figure 5:
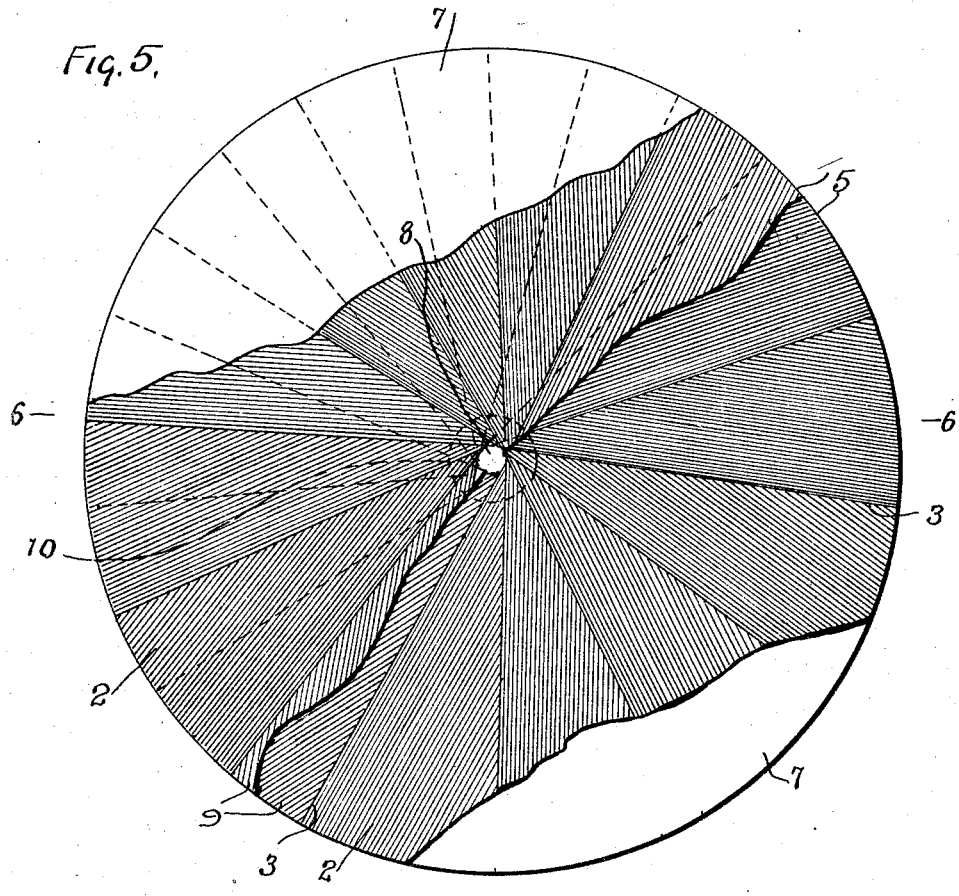
Figure 5 is a plan view of the wheel having overlapping sections, and of the veneer covering.
Figure 6:
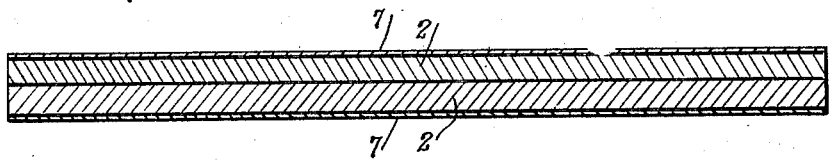
Figure 6 is a section on the line 6—6 of Figure 5.

Referring to the drawings in detail:

1 is a board from which a plurality of pie-shaped segments 2 are cut. To secure these segments, the board is so sawed diagonally along the lines 3 and transversely along the lines 4. From the drawing it will be seen that the resulting segments have the grain of substance of which they are composed running parallel to one straight edge and at an angle to another straight edge. In order to give the outer end 5 of the segment the proper curvature to form the periphery of the wheel, that end of the segment is removed to an extent sufficient to give this curvature. This results in only the small area designated 6 being wasted in the board.

These segments are preferably made up of cheaper woods and material, or may be made from scrap, thus eliminating the more expensive veneers which are now used in the art for making wood disc wheels.

I then take these sections or segments in which the grain runs parallel to the main axis thereof in my preferred form, and assemble these sections with their points adjacent a common center, and substantially the same distance from such common center. These points, however, of the segments do not coincide on the same center, as the segments are so arranged that their adjacent faces are never on the same line or parallel to the adjacent faces of any two segments. Thus these lines of division are always at an angle to one another, and are also off the exact center of the wheel, thus securing great rigidity of the structure, despite its being made from a plurality of parts. These parts are glued to one another.

In Figure 5 it will be seen that two of such structures are constructed to form a single wheel, and are so arranged to one another that the solid portion of one segment will overlap the adjoining edges of two segments in the other structure. Thus the grains of the segments of the two structures run at an angle to one another, and no joints are superimposed upon joints in the other structure. The outer surfaces of the combined structures are covered with veneer designated 7.

The center about which these structures are assembled is designated 8, while the grain of each segment is designated 9.

As indicated by the dotted line 10, the center of the several structures is cut away to form a passageway for the axle of a vehicle to which the wheel is to be attached.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a laminated structure for wheels, a plurality of triangular sections having their edges adjacent to one another and their points laid about on a circle around a common center, said points being spaced from one another, a second similar structure laid out about the same center, the segments of one of the structures overlapping the joints of the other structure, the grain of each of the sections being parallel to one straight edge and at an angle to another straight edge.

2. In a laminated structure for wheels, a plurality of triangular sections having their edges adjacent to one another and their points laid about on a circle around a common center, said points being spaced from one another, a second similar structure laid out about the same center, the segments of one of the structures overlapping the joints of the other structure, the grain of each of the sections being parallel to one straight edge and at an angle to another straight edge, and a veneer covering on either side of the assembled wheel.

In testimony whereof, I affix my signature.

FRANK V. TISCHER.